(12) United States Patent
Wada

(10) Patent No.: US 8,503,832 B2
(45) Date of Patent: Aug. 6, 2013

(54) ELECTRONIC DEVICE AND FACIAL IMAGE DISPLAY APPARATUS

(75) Inventor: Kouetsu Wada, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/528,706

(22) Filed: Jun. 20, 2012

(65) Prior Publication Data

US 2012/0257801 A1 Oct. 11, 2012

Related U.S. Application Data

(63) Continuation of application No. 12/233,453, filed on Sep. 18, 2008, now abandoned.

(30) Foreign Application Priority Data

Sep. 28, 2007 (JP) .................................. 2007-256524

(51) Int. Cl.
*G06K 9/00* (2006.01)
*G06K 9/60* (2006.01)
*G06K 9/62* (2006.01)
*G06F 3/048* (2006.01)

(52) U.S. Cl.
USPC ........... 382/305; 382/118; 382/224; 382/225; 715/838

(58) Field of Classification Search
None
See application file for complete search history.

(56) References Cited

U.S. PATENT DOCUMENTS

| 7,203,367 | B2 | 4/2007 | Shniberg et al. | |
| 7,853,897 | B2 | 12/2010 | Ogawa et al. | |
| 7,979,879 | B2 | 7/2011 | Kazama et al. | |
| 8,064,656 | B2 * | 11/2011 | Fukushima et al. | 382/118 |
| 8,103,062 | B2 * | 1/2012 | Abe et al. | 382/118 |
| 2003/0086692 | A1 | 5/2003 | Hori et al. | |

(Continued)

FOREIGN PATENT DOCUMENTS

| JP | 2001-167110 | 6/2001 |
| JP | 2001-309269 | 11/2001 |

(Continued)

OTHER PUBLICATIONS

Wei et al.: "TV program classification based on face and text processing", Multimedia and Expo, 2000; ICME 2000; 2000 IEEE Int'l Conf on; vol. 3, pp. 1345-1348.*

(Continued)

*Primary Examiner* — Matthew Bella
*Assistant Examiner* — Thomas Conway
(74) *Attorney, Agent, or Firm* — Blakely, Sokoloff, Taylor & Zafman LLP

(57) ABSTRACT

According to one embodiment, an electronic apparatus includes a storage device which stores face thumbnail indexing information including face images and time stamp information, extracting module configure to assign time zones to a video content data and to extract face images belonging to each time zone based on a time stamp information, classifying module configure to classify facial images of the same person from the extracted facial images, calculating module configure to calculate a frequency of appearance of each classified facial image, and facial image indication module configure to display a list of the facial images included in the facial image indexing information in a facial image indication in a two-dimensional display area, the facial image indication having time-zone-specific display areas in columns corresponding to the time zones, each facial image displayed in each time-zone-specific display area being displayed in a size based on the frequency of appearance.

9 Claims, 16 Drawing Sheets

U.S. PATENT DOCUMENTS

| | | | |
|---|---|---|---|
| 2004/0070631 A1* | 4/2004 | Brown et al. | 345/838 |
| 2005/0187943 A1 | 8/2005 | Finke-Anlauff et al. | |
| 2005/0259959 A1 | 11/2005 | Nagao et al. | |
| 2007/0120823 A1 | 5/2007 | Otsuka et al. | |
| 2007/0274596 A1 | 11/2007 | Murata et al. | |
| 2008/0098316 A1* | 4/2008 | Declan | 715/764 |
| 2008/0166027 A1 | 7/2008 | Jeong et al. | |
| 2009/0087037 A1 | 4/2009 | Wada | |

FOREIGN PATENT DOCUMENTS

| | | |
|---|---|---|
| JP | 2003-513350 | 4/2003 |
| JP | 2004-072404 | 3/2004 |
| JP | 2005-236646 | 9/2005 |
| JP | 2007-148949 | 6/2007 |
| JP | 2007-174589 | 7/2007 |
| WO | WO 2006-077512 | 7/2006 |

OTHER PUBLICATIONS

Wei et al.: "TV program classifocation based on face and text processing", Multimedia and Expo, 2000. ICME 2000. 2000 IEEE Int'l Conf on; vol. 3, pp. 1345-1348.

U.S. Appl. No. 12/233,453, Notice of Allowance, mailed Mar. 20, 2012.

Japanese Patent Application No. 2011-279891, First Office Action, mailed Dec. 18, 2012, (with English Translation).

* cited by examiner

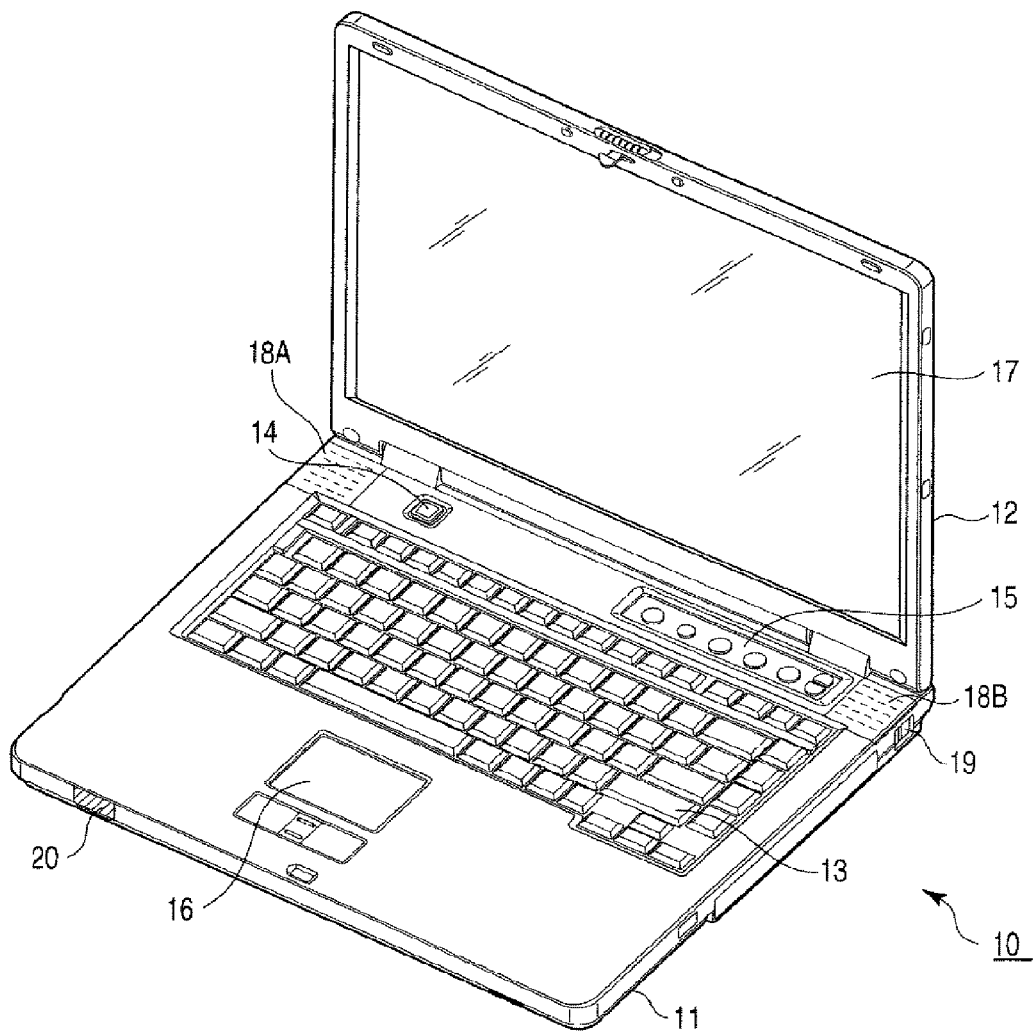
F I G. 1

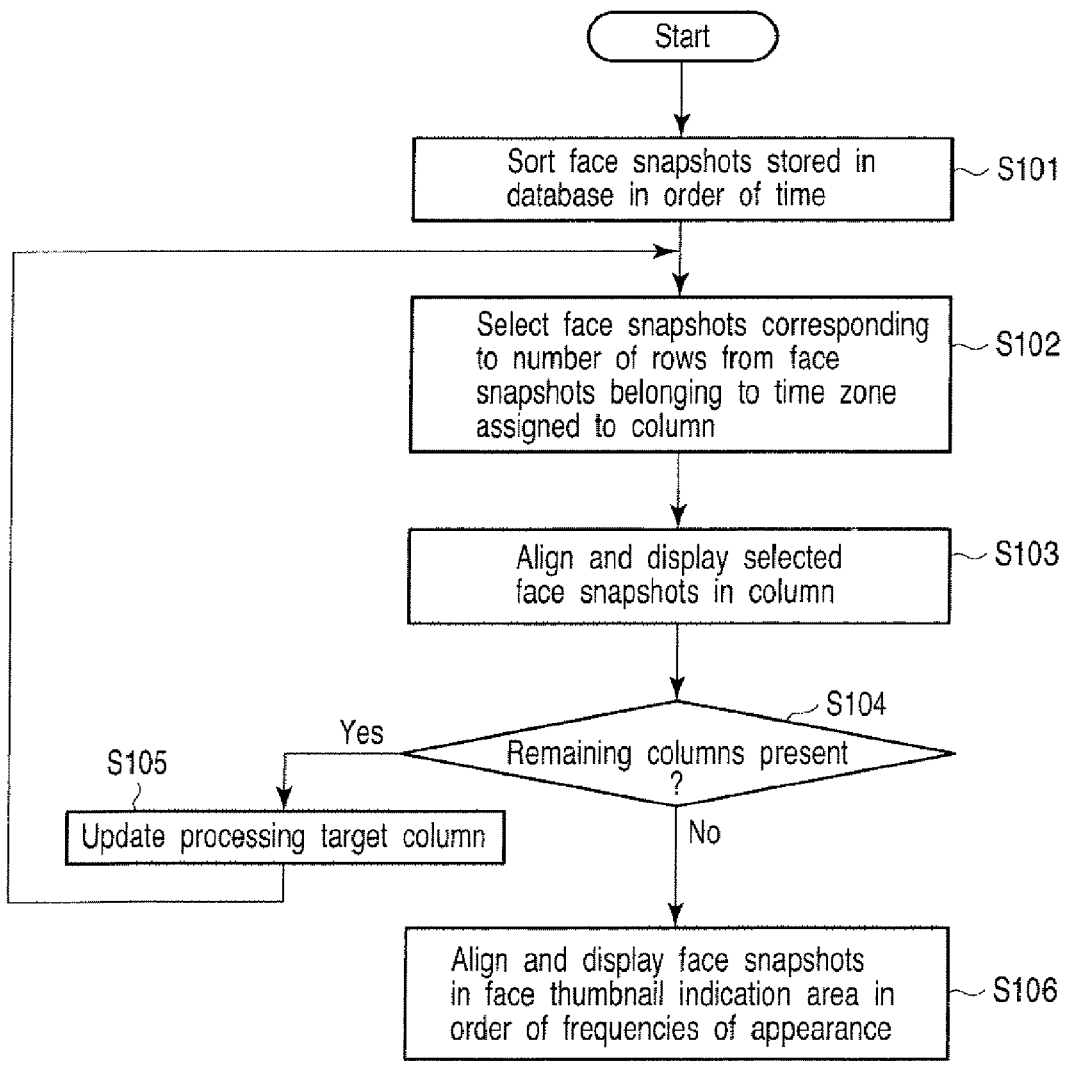
F I G. 1 4

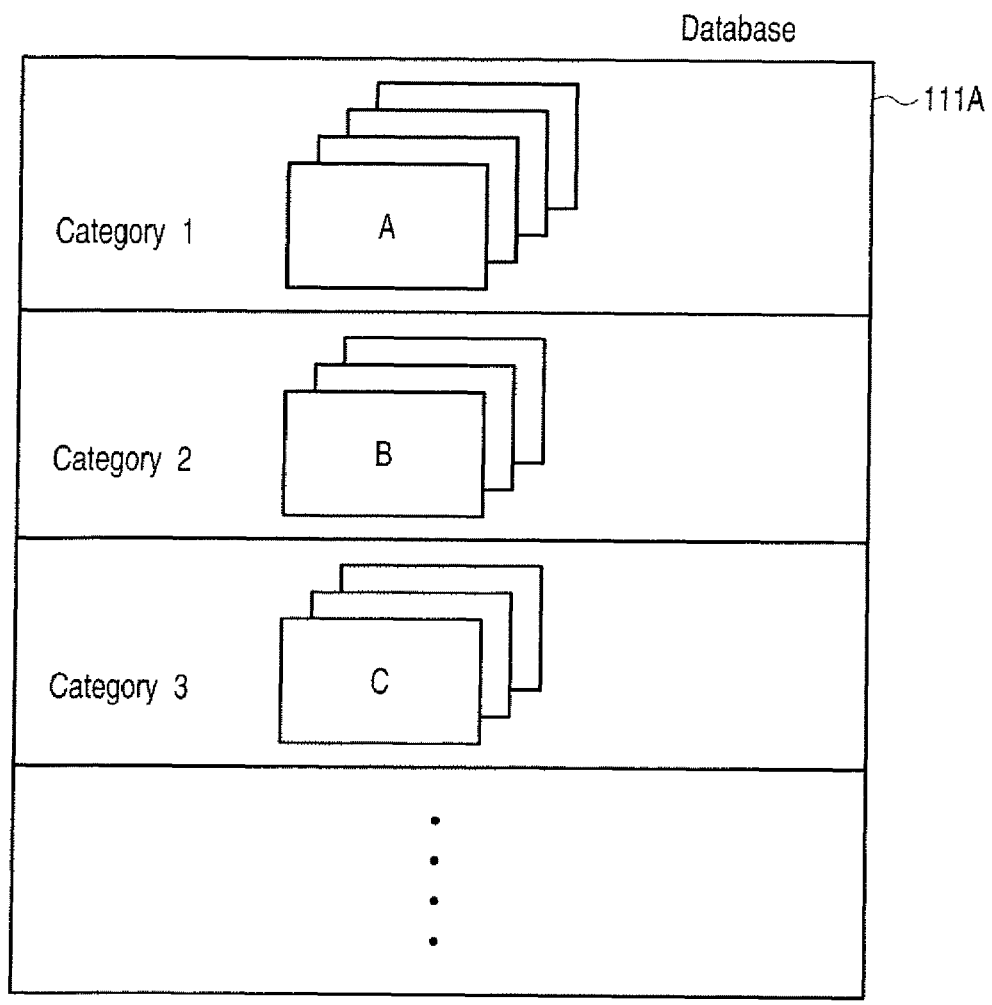
F I G. 15

ELECTRONIC DEVICE AND FACIAL IMAGE DISPLAY APPARATUS

CROSS-REFERENCE TO RELATED APPLICATIONS

This application is a continuation of U.S. application Ser. No. 12/233,453, now abandoned, which is based upon and claims the benefit of priority from Japanese Patent Application No. 2007-256524, filed Sep. 28, 2007, the entire contents of which are incorporated herein by reference.

BACKGROUND

1. Field

One embodiment of the present invention relates to an electronic apparatus and a facial image display method that display a facial image that appears in image contents.

2. Description of the Related Art

In this case, a title name is added to each video content data stored in the electronic apparatus, but grasping contents in each video content data from the title name alone is difficult. Therefore, playing back the video content data is required to grasp the contents in the video content data. However, even when, e.g., a fast-forward playback function is used, playback of video content data having a long total time requires a large amount of time.

Jpn. Pat. Appln. KOKAI Publication No. 2001-309269 discloses an apparatus having a character list display function. This apparatus has a function of aligning and displaying facial images of respective characters in image contents as a list of the characters in the image contents.

However, when a list of characters is simply displayed like Jpn. Pat. Appln. KOKAI Publication No 2001-309269, a user cannot grasp which time zone in video content data that each character appears. For example, the user may want to selectively play back a time zone alone that a person (or a group of persons) that the user are interested in appears. Therefore, a new function of presenting which time zone in entire video content data that each person appears must be realized. Further, there is also a demand to increase the number of facial images to be displayed as much as possible.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a perspective view showing an example of an appearance of an electronic apparatus according to an embodiment of the present invention;

FIG. 14 is a flowchart showing an example of a procedure of face thumbnail snapshot indication processing executed by the electronic apparatus according to the embodiment;

FIG. 15 is a view showing a state where face thumbnail snapshots are classified into respective categories by the electronic apparatus according to the embodiment.

DETAILED DESCRIPTION

Figure 2:
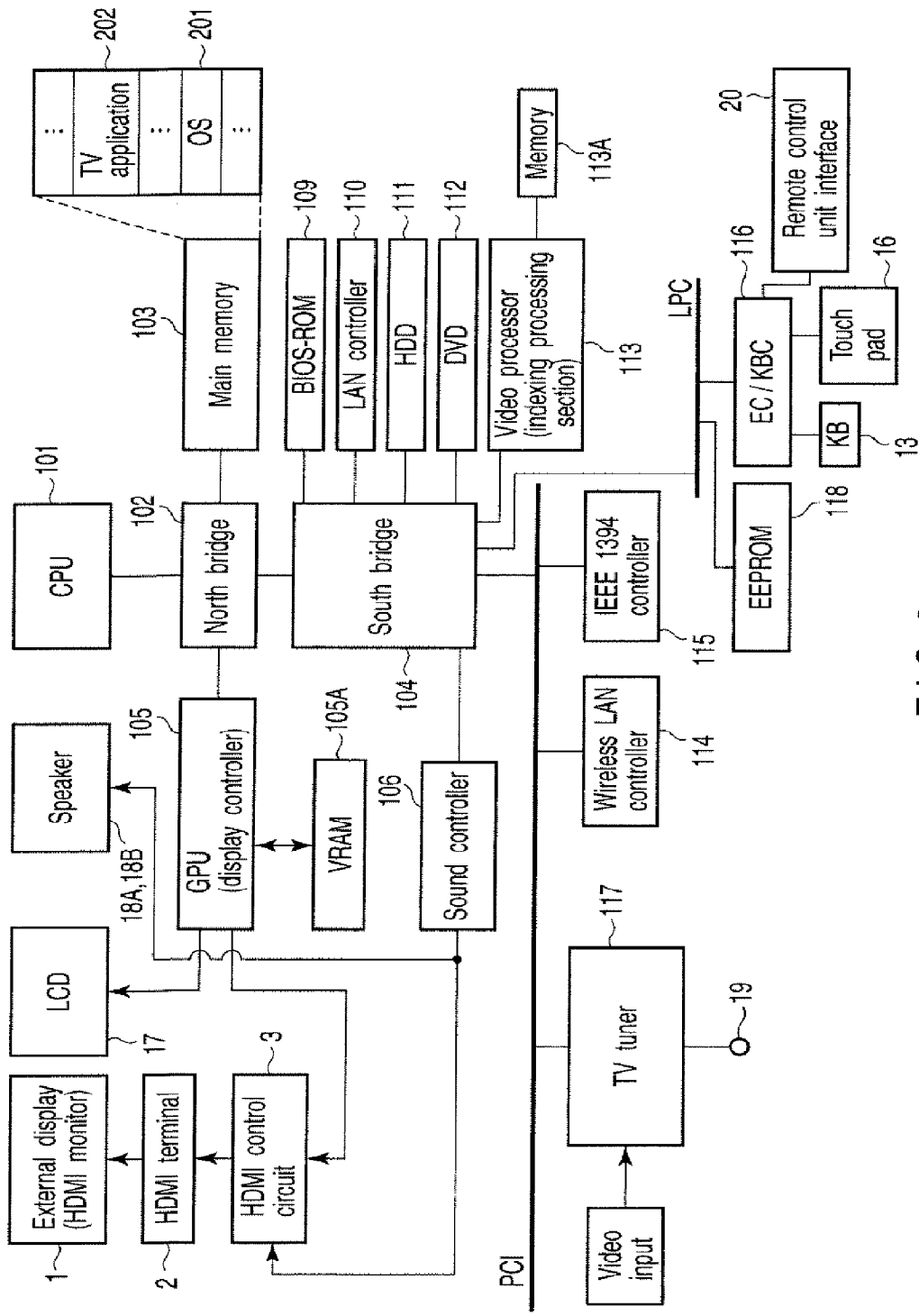
FIG. 2 is a block diagram showing an example of a system configuration of the electronic apparatus according to the embodiment.

Various embodiments according to the invention will be described hereinafter with reference to the accompanying drawings. In general, according to one embodiment of the invention, an electronic apparatus includes storage device which stores face thumbnail indexing information including a plurality face images extracted from video content data and time stamp information indicative of a time point at which each facial image appears in the video content data, extracting module configure to assign a plurality of time zones to the video content data and to extract face images belonging to each time zone based on the time stamp information, classifying module configure to classify facial images of the same person from the extracted facial images, calculating module configure to calculate a frequency of appearance of each classified facial image, and facial image indication module configure to display a list of the plurality of facial images included in the facial image indexing information in a facial image indication in a two-dimensional display area, the facial image indication having time-zone-specific display areas in a plurality of columns corresponding to the plurality of time zones, each facial image displayed in each time-zone-specific display area being displayed in a size based on the frequency of appearance.

First, a configuration of an electronic apparatus according to one embodiment of the present invention will be explained with reference to FIGS. 1 and 2. The electronic apparatus according to this embodiment is realized as, e.g., a notebook type portable personal computer 10 that functions as an information processing apparatus.

This personal computer 10 can record and play back video content data (audio visual content data) such as broadcast program data or video data input from an external device. That is, the personal computer 10 has a television (TV) function of executing viewing and recording of broadcast program data broadcast by using a television broadcast signal. This TV function is realized by, e.g., a TV application program previously installed in the personal computer 10. Further, the TV function also has a function of recording video data input from an external AV device and a function of playing back recorded video data and recorded broadcast program data.

Furthermore, the personal computer 10 has a face thumb list display function (face navigation function) of displaying, e.g., a list of face thumbs of persons who appear in video content data such as video data or broadcast program data stored in the personal computer 10. This face navigation function is implemented as, e.g., one function in the TV function. The face navigation function is one of image indexing functions that present a user, e.g., an outline of video content data. This face navigation function can present a user which person appears in which time zone in entire video content data. Furthermore, this face navigation function can pay attention to a predetermined attribute section included in video content data to display a list of persons.

FIG. 1 is a perspective view showing a state where a display unit of the computer 10 is opened. This computer 10 is formed of a computer main body 11 and a display unit 12. A display apparatus formed of a thin-film-transistor liquid crystal display (TFT-LCD) 17 is incorporated in the display unit 12.

The display unit 12 is disposed to the computer main body 11 in such a manner that the display unit 12 can swivel without restraint between an opened position where an upper surface of the computer main body 11 is exposed and a closed position where the upper surface of the computer main body 11 is covered. The computer main body 11 has a thin box-like case, and a keyboard 13, a power button 14 that turns on/off the computer 10, an input operation panel 15, a touch pad 16, speakers 18A and 18B, and others are arranged on an upper surface of this case.

The input operation panel 15 is an input apparatus that inputs an event corresponding to a pressed button, and includes a plurality of buttons that activate a plurality of functions, respectively. This button group also includes an operation button group that is used to control the TV function (viewing, recording, and playback of broadcast program data/video data). Moreover, a remote control unit interface module 20 that executes communication with a remote control unit that remotely controls the TV function of the computer 10 is provided on a front surface of the computer main body 11. The remote control unit interface module 20 is formed of, e.g., an infrared signal receiving module.

A TV broadcast antenna terminal 19 is provided on, e.g., a right side surface of the computer main body 11. Additionally, an external display connection terminal conforming to, e.g., the High-Definition Multimedia Interface (HDMI) standard is provided on, e.g., a rear surface of the computer main body 11. This external display connection terminal is used to output image data (moving image data) included in video content data such as broadcast program data to an external display.

A system configuration of the computer 10 will now be explained with reference to FIG. 2.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, an LAN controller 110, a hard disk drive (HDD) 111, a DVD drive 112, a video processor 113, a memory 113A, a wireless LAN controller 114, an IEEE 1394 controller 115, an embedded controller/keyboard controller IC (EC/KBC) 116, a TV tuner 117, an EEPROM 118, and others.

The CPU 101 is a processor that controls operations of the computer 10, and executes various kinds of application programs such as an operating system (OS) 201 or a TV application program 202 which is loaded from the hard disk drive (HDD) 111 to the main memory 103. The TV application program 202 is software that executes the TV function. This TV application program 202 executes live playback processing to view broadcast program data received by the TV tuner 117, recording processing to record the received broadcast program data in the HDD 111, playback processing to play back the broadcast program data/video data recorded in the HDD 111, and others. Further, the CPU 101 also executes a basic input-output system (BIOS) stored in the BIOS-ROM 109. The BIOS is a program for hardware control.

The north bridge 102 is a bridge device that connects a local bus of the CPU 101 with the south bridge 104. The north bridge 102 also has a built-in memory controller that performs access control over the main memory 103. Furthermore, the north bridge 102 also has a function of executing communication with the GPU 105 through, e.g., a serial bus based on the PCI EXPRESS standard.

The GPU 105 is a display controller that controls the LCD 17 which is used as a display monitor of the computer 10. A display signal generated by this GPU 105 is supplied to the LCD 17. Moreover, the GPU 105 can also transmit a digital video signal to an external display apparatus 1 through an HDMI control circuit 3 and an HDMI terminal 2.

The HDMI terminal 2 is the above-explained external display connection terminal. The HDMI terminal 2 can transmit a non-compressed digital video signal and a digital audio signal to the external display apparatus 1 such as a television set through one cable. The HDMI control circuit 3 is an interface that transmits the digital video signal to the external display apparatus 1 called an HDMI monitor through the HDMI terminal 2.

The south bridge 104 controls each device on a low pin count (LPC) bus and each device on a Peripheral Component Interconnect (PCI) bus. Additionally, the south bridge 104 has a built-in Integrated Drive Electronics (IDE) controller that controls the hard disk drive (HDD) 111 and the DVD drive 112. Further, the south bridge 104 also has a function of executing communication with the sound controller 106.

Furthermore, the video processor 113 is connected with the south bridge 104 through, e.g., a serial bus based on the PCI EXPRESS standard.

The video processor 113 is a processor that executes various kinds of processing concerning the above-explained screen image indexing. This video processor 113 functions as an indexing processing module that executes screen image indexing processing. That is, in the screen image indexing processing, the video processor 113 extracts a plurality of face thumb from screen image data included in video content data and outputs, e.g., time stamp information indicative of a time point at which each extracted face thumb appears in the video content data. Extraction of face thumbs is executed based on, e.g., face detection processing of detecting a facial region from each frame in screen image data, cutout processing of cutting out a detected face thumb from the frame, and others. Detection of the facial region can be performed by, e.g., analyzing characteristics of a screen image in each frame and searching for a region having characteristics similar to facial image characteristic samples prepared in advance. The facial image characteristic samples are characteristic data obtained by statistically processing respective facial image characteristics of many persons.

The memory 113A is used as a work memory of the video processor 113. A large amount of calculation is required to execute the indexing processing (the commercial detection processing, the screen image indexing processing, and the sound indexing processing). In this embodiment, the video processor 131 as a dedicated processor different from the CPU 101 is used as a back-end processor, and this video processor 113 executes the indexing processing. Therefore, the indexing processing can be executed without increasing a load of the CPU 101.

The sound controller 106 is a sound source device and outputs audio data as a playback target to the speakers 18A and 18B or the HDMI control circuit 3.

The wireless LAN controller 114 is a wireless communication device that executes wireless communication based on, e.g., an IEEE 802.11 standard. The IEEE 1394 controller 115 executes communication with an external device through a serial bus based on an IEEE 1394 standard.

The embedded controller/keyboard controller IC (EC/KBC) 116 is a one-chip microcomputer in which an embedded controller that manages an electric power and a keyboard controller that controls the keyboard (KB) 13 and the touch pad 16 are integrated. This embedded controller/keyboard controller IC (EC/KBC) 116 has a function of turning on/off a power supply of the computer 10 in accordance with an operation of the power button 14 by a user. Furthermore, the embedded controller/keyboard controller IC (EC/KBC) 116 has a function of executing communication with the remote control unit interface 20.

The TV tuner 117 is a reception apparatus that receives broadcast program data broadcast by using a television (TV) broadcast signal, and connected with the antenna terminal 19. This TV tuner 117 is realized as, e.g., a digital TV tuner that can receive digital broadcast program data such as terrestrial digital TV broadcasting. Moreover, the TV tuner 117 also has a function of capturing video data input from an external device.

A face navigation function executed by the TV application program 202 will now be explained with reference to FIG. 3.

As explained above, the indexing processing (screen image indexing processing and sound indexing processing) with respect to video content data such as broadcast program data is executed by the video processor 113 that functions as the indexing processing module as explained above.

The video processor 113 executes the indexing processing with respect to video content data such as recorded broadcast program data specified by a user under control of the TV application program 202, for example. Additionally, the video processor 113 can also execute the indexing processing with respect to the broadcast program data in parallel with recording processing of storing the broadcast program data received by the TV turner 117 in the HDD 111.

In the screen image indexing processing (which is also referred to as face thumb indexing processing), the video processor 113 analyzes moving image data included in video content data in units of frame. Further, the video processor 113 extracts face thumbs of persons from a plurality of frames constituting the moving image data and outputs time stamp information indicative of a time point at which each extracted facial image appears in the video content data. As the time stamp information corresponding to each face thumb, it is possible to use an elapsed time from start of the video content data to appearance of the face thumb, a frame number from which the face thumb is extracted, and others.

Furthermore, the video processor 113 also outputs the size (resolution) of each extracted face thumb. Face detection result data (face thumb, time stamp information TS, and size) output from the video processor 113 is stored in a database 111A as face thumb indexing information. This database 111A is a storage region for indexing data storage prepared in the HDD 111.

Moreover, in the screen image indexing processing, the video processor 113 also executes scene thumbnail snapshot acquisition processing in parallel with processing of extracting face thumbnail snapshots. A scene thumbnail snapshot is an image (reduced image) corresponding to each of the plurality of frames extracted from the video content data at, e.g., equal time intervals. That is, the video processor 113 sequentially extracts the frames from the video content data at, e.g., predetermined equal time intervals irrespective of whether the frames are frames including face thumbnail snapshots, and outputs an image corresponding to each extracted frame (scene thumbnail snapshot) and time stamp information TS indicative of a time point at which this scene thumbnail snapshot appears. Scene thumbnail snapshot acquisition result data (scene thumbnail snapshot, time stamp information TS) output from the video processor 113 is also stored in the database 111A as scene thumbnail indexing information.

Figure 3:
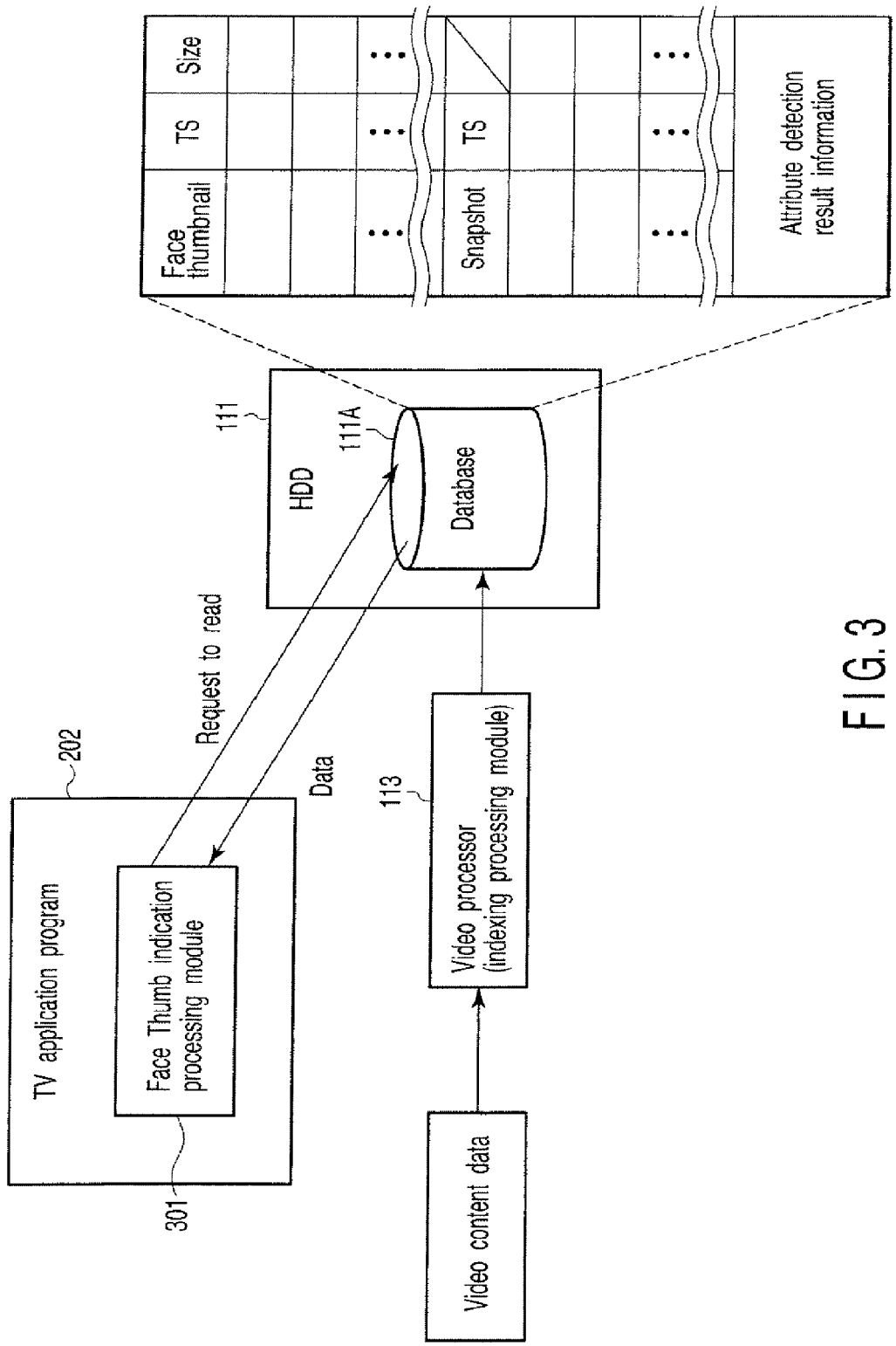
FIG. 3 is an exemplary block diagram for explaining a face thumb display function of the electronic apparatus according to the embodiment.

As shown in FIG. 3, the TV application program 202 includes a face thumb indication processing module 301 that executes a face navigation function. This face thumb indication processing module 301 is realized as, e.g., an indexing viewer program, and displays an indexing view screen for looking down at an outline of the video content data by using the indexing information (face thumb indexing information, scene thumbnail indexing information, section attribute information, and others) stored in the database 111A.

Specifically, the face thumb indication processing module 301 reads the face thumb indexing information (face thumbs, time stamp information TS, and sizes) from the database 111A and uses this face thumb indexing information to display a list of face thumbs of persons who appear in the video content data in a two-dimensional display area (which will be referred to as a face thumb indication area hereinafter) in the indexing view screen. In this case, the face thumb indication processing module 301 divides a total time length of the video content data into a plurality of time zones at, e.g., equal intervals and selects a predetermined number of face thumbs that appear in each time zone from the extracted face thumbs in accordance with each time zone. Moreover, the face thumb indication processing module 301 aligns and displays the predetermined number of selected face thumbs in accordance with each time zone.

That is, the two-dimensional face thumbnail indication area includes a plurality of face snapshot display areas arranged in a matrix shape including a plurality of rows and a plurality of columns. The plurality of time zones constituting the total time length of the video content data is assigned to the plurality of columns, respectively. Specifically, for example, a plurality of time zones having the same time length which are obtained by dividing the total time length of the video content data by the number of the columns at equal intervals are assigned to the plurality of columns, respectively. Of course, the time zones assigned to the respective columns do not have to necessarily have the same time length.

The face thumbnail indication processing module 301 aligns and displays respective face thumbnail snapshots belonging to the time zone assigned to each column in the face video indication areas corresponding to the number of rows belonging to the each column in order of, e.g., appearance frequency (order of detection time length of the face thumbnail snapshots) based on the respective pieces of time stamp information TS associated with the face thumbnail snapshots. In this case, for example, face thumbnail snapshots having higher appearance frequencies (emergence frequencies) are selected for the number of rows from the facial thumbnail snapshots belonging to the time zone assigned to each column, and the selected face thumbnail snapshots are aligned and arranged from an upper side toward a lower side in order of emergence frequency. Of course, the face thumbnail snapshots which appear in the time zone assigned to each column may be aligned and displayed in order of appearance in place of order of appearance frequency.

This face navigation function enables presenting a user which person appears in which time zone in the entire video content data. A specific structural example of the face thumb indication area will be explained later with reference to FIG. 5 and subsequent drawings.

Further, the face thumb indication processing module 301 reads the scene thumbnail indexing information (scene thumbnails, time stamp information TS) from the database 111A, and aligns and displays the respective scene thumbnail images in a scene thumbnail display area (which will be referred to as a scene thumbnail indication area hereinafter) arranged on one of or both a lower side and an upper side of the face thumb indication area in order of appearance time of the scene thumbnail images.

A time zone where no facial image appears may be present depending on video content data. Therefore, displaying both the face thumb indication area and the scene thumbnail indication area in the indexing view screen enables presenting user content of video content data in a time zone where no facial image appears even in this time zone.

Figure 4:
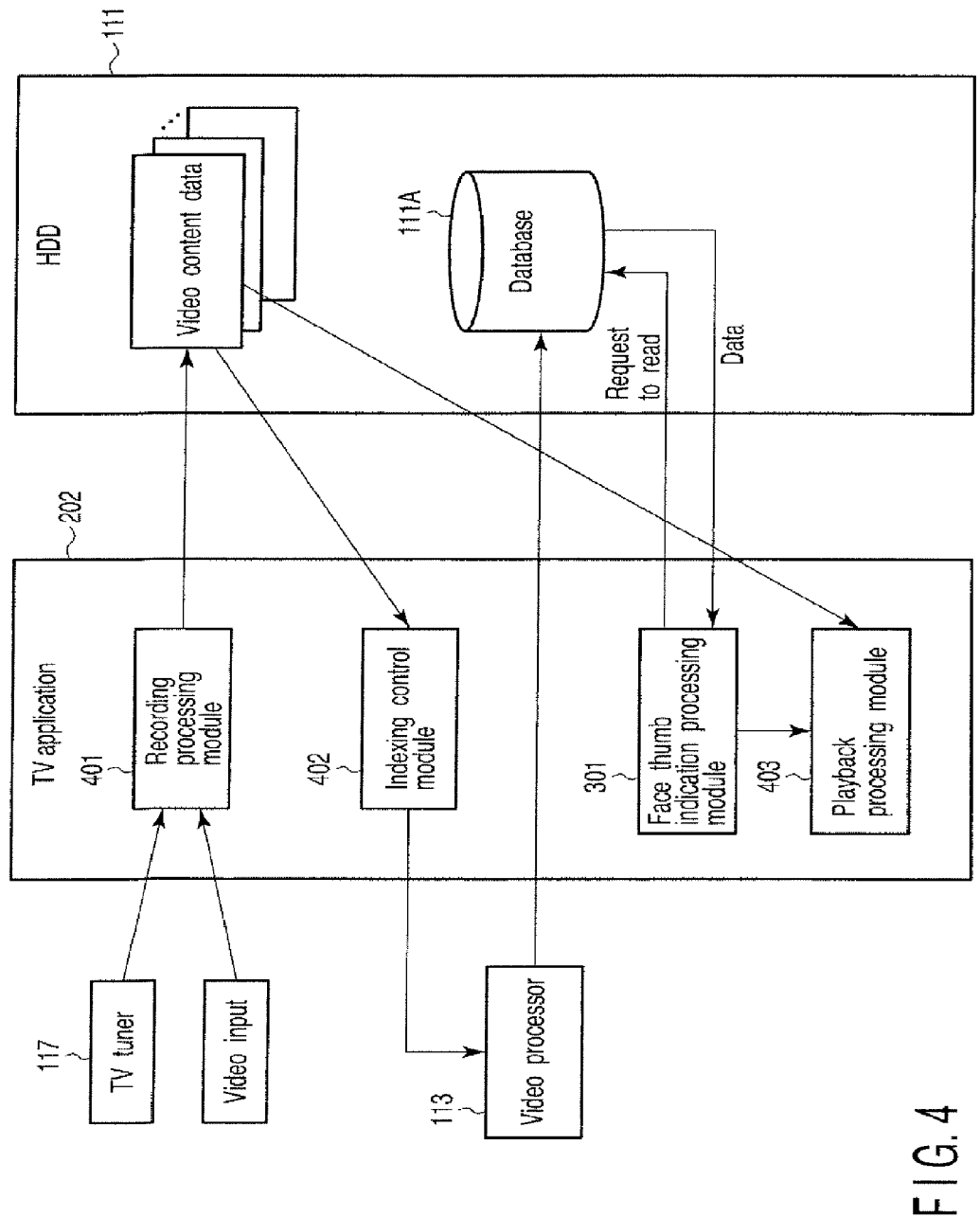
FIG. 4 is a block diagram showing a functional structure of a program used in an electronic apparatus according to the embodiment.

A functional structure of the TV application program 202 will now be explained with reference to FIG. 4.

The TV application program 202 includes a recording processing section 401, an indexing control section 402, a playback reproducing section 403, and others in addition to the face thumb indication processing section 301.

The recording processing module 401 executes recording processing of recording broadcast program data received by the TV tuner 117 or video data input from an external device in the HDD 111. Furthermore, the recording processing module 401 also executes reserved recording processing of using the TV tuner 117 to receive broadcast program data specified by recording reservation information (channel number, a date and an hour) preset by the user and recording the broadcast program data in the HDD 111.

The indexing control module 402 controls the video processor (indexing processing module) 113 and thereby allows the video processor 113 to execute the indexing processing (image indexing processing or sound indexing processing). The user can specify whether the indexing processing is to be executed in accordance with each broadcast program data as a recording target. For example, the indexing processing of broadcast program data as a recording target which is specified to be subjected to the indexing processing is automatically started after the broadcast program data is recorded in the HDD 111. Moreover, the user can also specify video content data which should be subjected to the indexing processing from video content data already stored in the HDD 111.

The playback processing section 403 executes processing of playing back each video content data stored in the HDD 111. Further, a playback processing section 403 has a function of starting playback of video content data from a time point that is behind a time point that a selected face thumb appears by a predetermined time when a playback instructing event is input by a user operation in a state where one face thumb is selected from a list of face thumbs in given video content data.

It is to be noted that the indexing processing does not have to be necessarily executed by the video processor 113, and the TV application program 202 may have a function of executing the indexing processing, for example. In this case, the indexing processing is executed by the CPU 101 under control of the TV application program 202.

Figure 7:
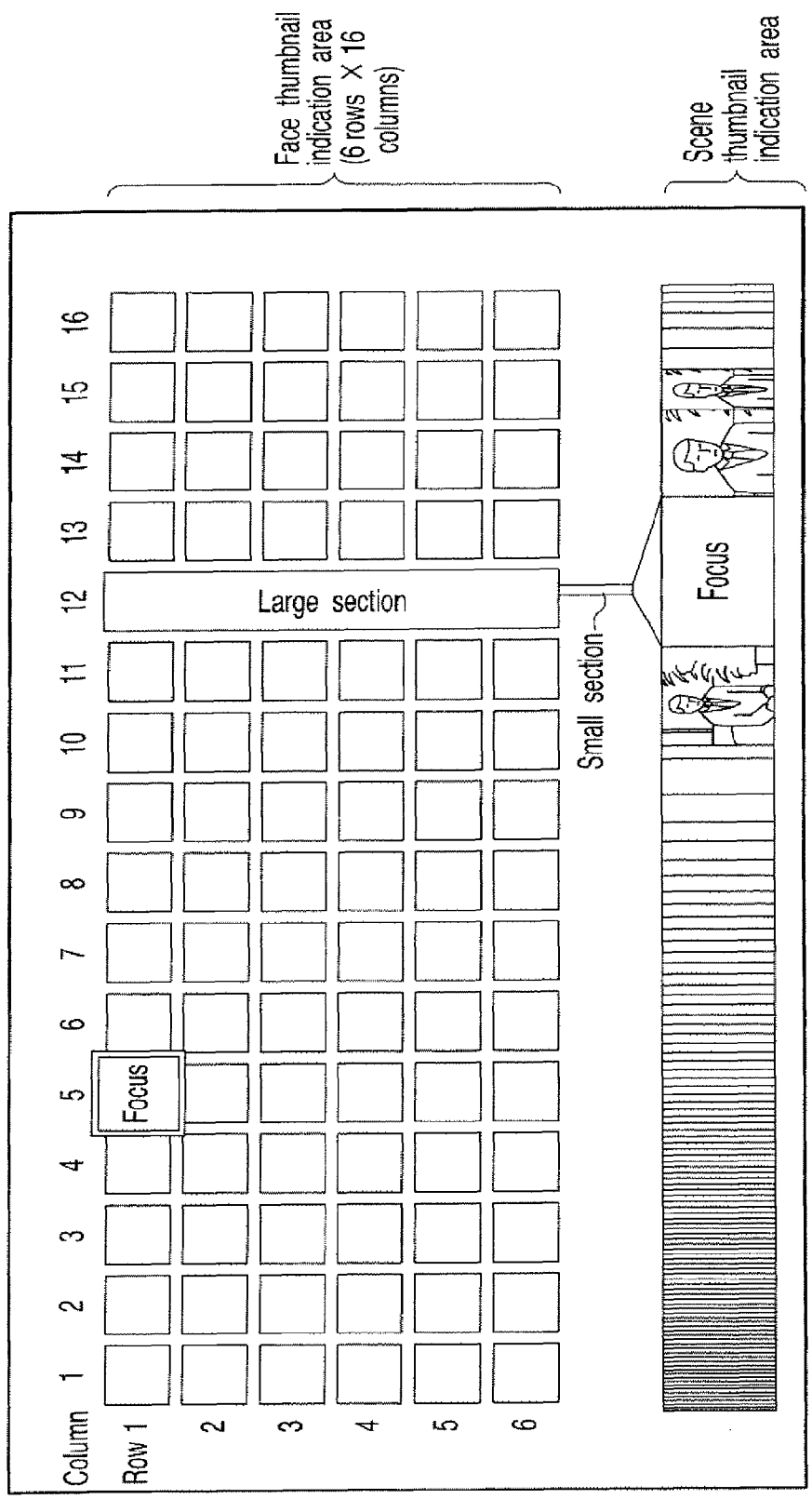
FIG. 7 is a view for explaining a relationship between the face thumbnail indication area and a bellows thumbnail display area included in the indexing view screen depicted in FIG. 6.

A specific structure of the indexing view screen will now be explained with reference to FIGS. 5 and 7.

Figure 5:
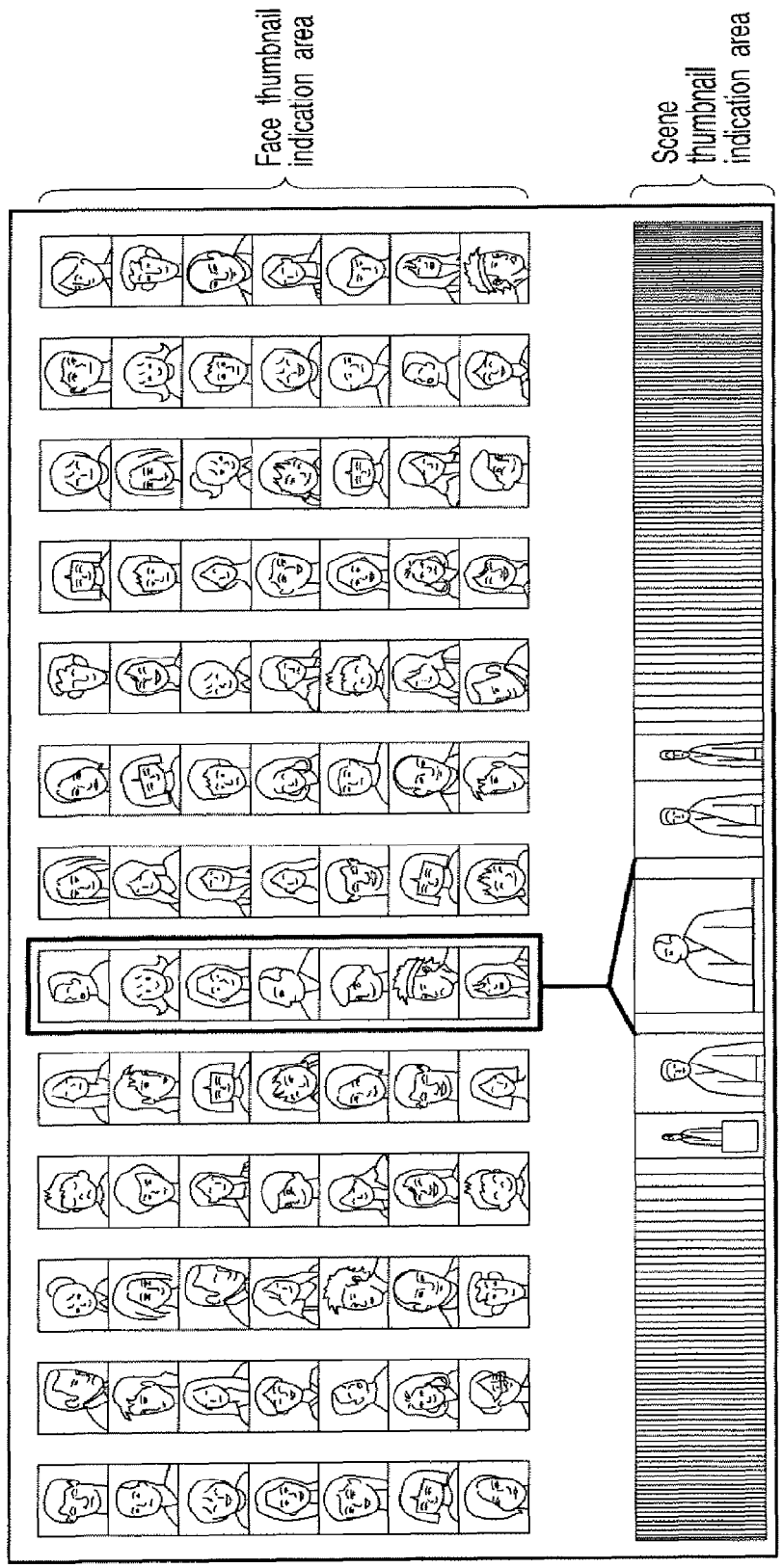
FIG. 5 is a view showing an example of an indexing view image displayed in a display apparatus by the electronic apparatus according to the embodiment.

FIG. 5 shows an example of the indexing view screen displayed in the LCD 17 by the face thumb indication processing section 301. This indexing view screen is a screen obtained by performing the indexing processing with respect to given video content data (e.g., broadcast program data). This indexing view screen includes the face thumb indication area which displays a list of face thumbs, the volume level indication area, the section bar, and the scene thumbnail indication area which displays a list of scene thumbnail snapshot in an accordion format.

Figure 6:
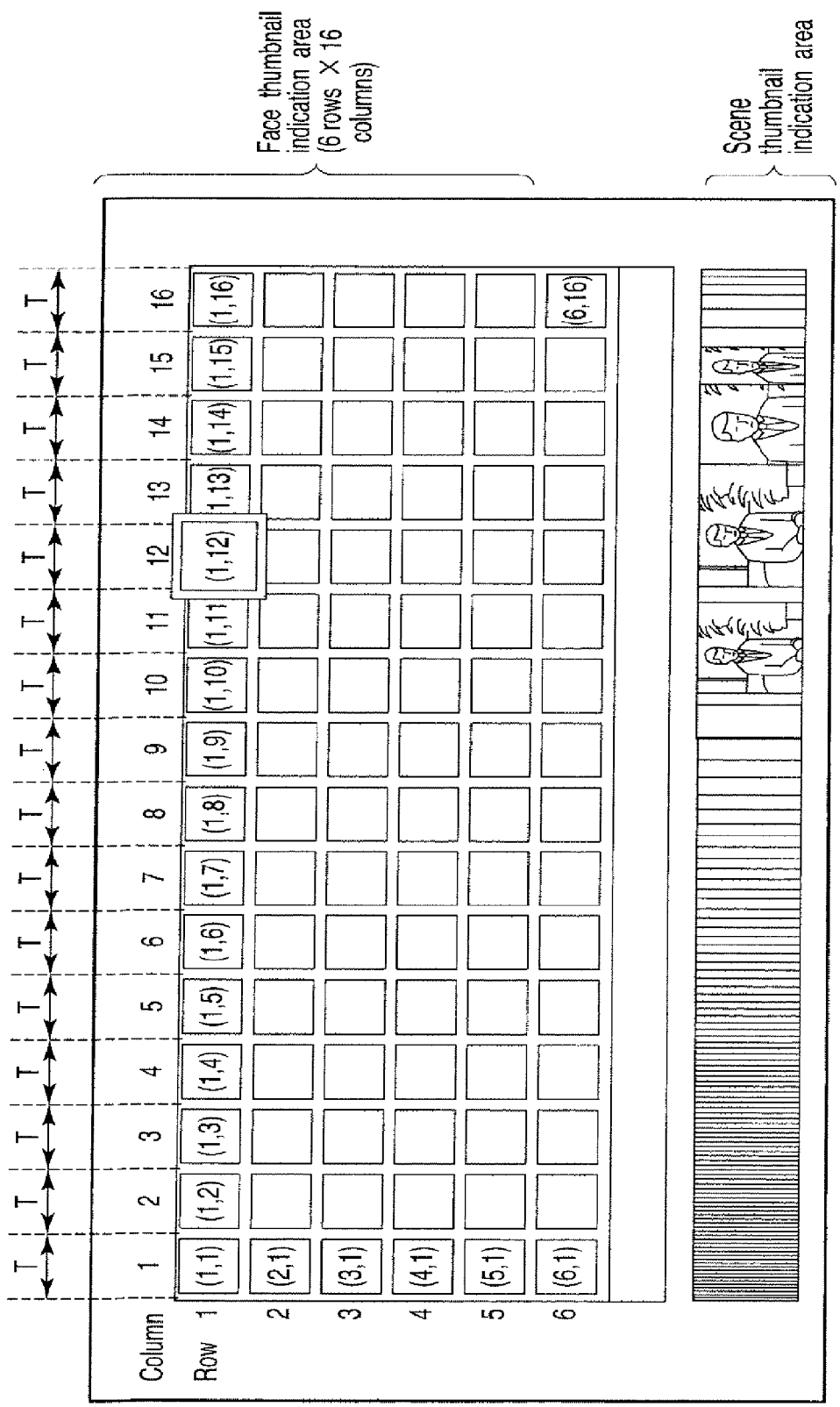
FIG. 6 is a view showing a structural example of a face thumbnail indication area included in the indexing view image depicted in FIG. 5.

Here, the accordion format means a display format in which a selected scene thumbnail snapshot is displayed in a regular size (full size) having an original aspect ratio and any other scene thumbnail snapshot is displayed while reducing its size in a lateral direction. In FIG. 6, each scene thumbnail snapshot having a larger distance from the selected scene thumbnail snapshot is reduced in the lateral size.

FIG. 6 shows a structural example of the face thumb indication area.

The face thumbnail indication area includes a plurality of face snapshot indication areas arranged in a matrix shape including a plurality of rows and a plurality of columns. In FIG. 6, the face thumbnail indication area consists of six rows×16 columns. The number of the facial snapshot indication areas included in the face thumbnail indication area is 96.

Each of a plurality of time zones having the same time length T obtained by, e.g., dividing a total time length of video content data by the number of the columns (=16) at equal intervals is assigned to each of the columns 1 to 16.

For example, if a total time length of video content data is two hours, the period of two hours is divided into the 16 time zones at equal intervals. In this case, the time length T of each time zone is 7.5 minutes. For example, a time zone starting from 0:00:00 to 0:07:30 is assigned to the column 1, a time zone from 0:07:30 to 0:15:00 is assigned to the column 2, and a time zone from 0:15:00 to 0:22:30 is assigned to the column 3. The time length T of each time zone varies in accordance with a total time length of video content data.

Of course, the lengths of the time zones assigned to the plurality of columns do not have to be necessarily equal to each other.

The face thumbnail indication processing module 301 aligns and displays respective face thumbnail snapshots belonging to the time zones assigned to the respective columns in the six face snapshot indication areas in the respective columns in the order of frequency based on the pieces of time stamp information corresponding to the face snapshots extracted by the video processor 113. In this case, the face thumbnail indication module 301 selects face thumbnail snapshots corresponding to the number of the rows (six) from the face thumbnail snapshots belonging to a time zone assigned to a display processing target column, and aligns and displays the selected face thumbnail snapshots corresponding to the number of the rows.

In this manner, the face thumb indication area uses a time axis in which a left end position (1, 1) is determined as a base point and a right end position (6, 16) is determined as a trailing end of video content data.

In regard to the size of a face thumbnail snapshot displayed in each face snapshot indication area in a face thumbnail indicating area, a user can select one from "large", "medium", and "small". The numbers of rows and columns are changed in accordance with the size of each face thumb selected by the user. Relationships between the size of each face thumb and the numbers of the rows and the columns are as follows.

(1) In the case of "large"; three rows×eight columns
(2) In the case of "medium"; six rows×16 columns
(3) In the case of "small"; 10 rows×24 columns In the case of "large", each face thumbnail snapshot is displayed in a size of, e.g., 180×180 pixels. In the case of "medium", each face thumbnail snapshot is displayed in a size of, e.g., 90×90 pixels. In the case of "small", each face thumbnail snapshot displayed in a size of, e.g., 60×60 pixels. The default face thumbnail snapshot size is set to, e.g., "medium".

Each face thumb in the face thumb indication area is set to either a non-selected "standard" state or a selected "focus" state. A size of a face thumbnail snapshot in a "focus" state is set to be larger than a size in a "standard" state (180×180, 90×90, or 60×60). FIG. 6 shows an example where a face thumb at a coordinate (1, 12) is in the "focus" state.

The number of the scene thumbnail snapshot displayed in the scene thumbnail indication area is set to, e.g., one of 240, 144, 96, and 48 in accordance with the user's setting. A default value is, e.g., 240.

The face thumbnail snapshot is set to one of two states, i.e., a non-selected "standard" state and a selected "focus" state. A thumbnail in the "focus" state is displayed in a size larger than those of other thumbnails.

A relationship between the face thumb indication area and the scene thumbnail indication area will now be explained with reference to FIG. 7.

An aggregation of face thumbnail indication areas bellowing to the same column, i.e., each column in the face thumbnail indication area is called a "large section". Further, each piece obtained by dividing the "large section" is called a "small section". The number of the small sections included in one large section is given as a quotient obtained by dividing the number of the scene thumbnail snapshots displayed in the scene thumbnail indication area by the number of the columns in the face thumbnail indication area. For example, if the face thumbnail indication area consists of six rows×16 columns and the number of thumbnails displayed in the bellows thumbnail display area is 240, the number of small sections included in one large section is 15 (=240÷16). One large section includes 15 small sections. In other words, 15 thumbnails belong to a time zone corresponding to one large section.

When a given scene thumbnail snapshot in the scene thumbnail indication area is selected, the face thumbnail indication processing module 301 selects a column (large section) to which a time zone of the selected scene thumbnail snapshot is assigned from the plurality of columns (plurality of large sections) in the face thumbnail indication area based on the time stamp information of the selected scene thumbnail snapshot. The selected large section is a large section including the selected scene thumbnail snapshot as the small section. Furthermore, the face thumbnail indication processing module 301 highlights the selected large section.

When a thumbnail in the bellows thumbnail display area is selected in this manner, a column (the large section) to which a time zone that the selected thumbnail belongs to is automatically selected from a plurality of columns in the face thumbnail indication area. As a result, the user can identify which column (the large section) in the face thumbnail indication area that the selected thumbnail corresponds to. Furthermore, the user can also identify from a vertically long bar which time point in which column (the large section) that the selected thumbnail corresponds to.

Meanwhile, as a size of a face thumbnail snapshot displayed in each face thumbnail snapshot indicating area in the face thumbnail indication area, the size of each face thumbnail snapshot can be changed and set in accordance with the frequency of appearance.

Figure 8A:
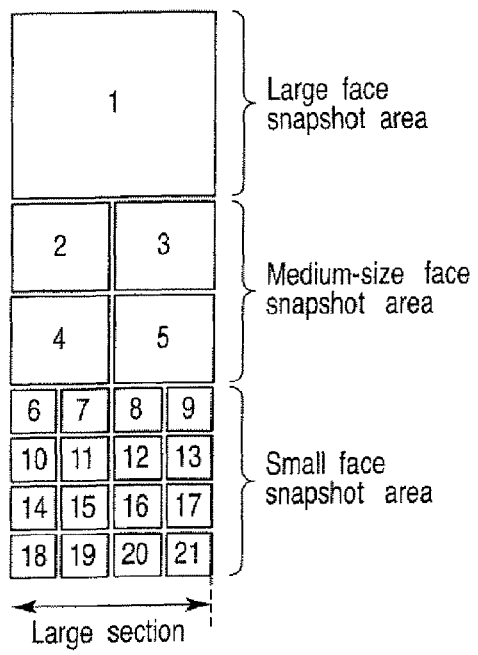
FIG. 8A, FIG. 8B, and FIG. 8C are views each showing an example of a face thumbnail snapshot arrangement format displayed in a large section in the face thumbnail indication area.
Figure 8B:
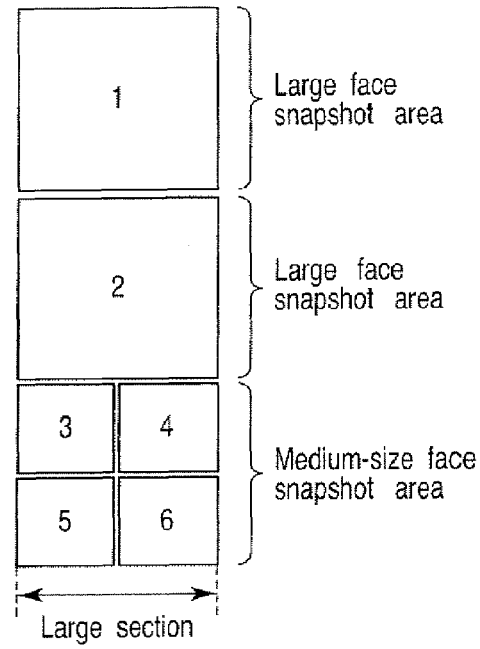
Figure 8C:
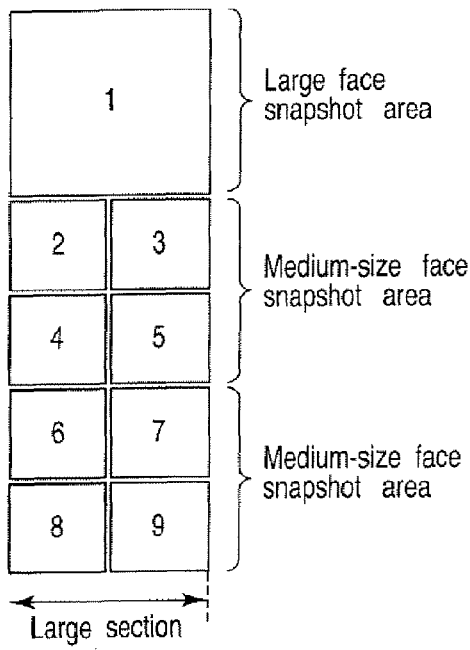

This setting can be selected from a plurality of arrangement formats prepared in advance. For example, as shown in FIGS. 8A to 8C, the user can select one from three arrangement formats. Each arrangement format depicted in FIG. 8 represents one large section, and this arrangement format is displayed in eight columns. It is to be noted that a rectangular region in each area in FIGS. 8A to 8C is a region where a face thumbnail snapshot is displayed. Numerals indicated in the each rectangular region represent the order of frequency of appearance.

The arrangement format shown in FIG. 8A has a large face snapshot area, a medium-size face snapshot area, and a small face snapshot area. One face snapshot having the highest frequency of appearance is displayed in the large face snapshot area. Four face snapshots having second to fifth frequencies of appearance are displayed in the medium-size face snapshot area. 16 face snapshots having sixth to 21st frequencies of appearance are displayed in the small face snapshot area.

The arrangement format shown in FIG. 8B has large face snapshot areas and a medium-size face snapshot area. Two face snapshots of faces having the highest and second frequencies of appearance are displayed in the large face snapshot areas. Four face snapshots having third to sixth frequencies of appearance are displayed in the medium-size face snapshot area.

The arrangement format shown in FIG. 8C has a large face snapshot area and medium-size face snapshot areas. One face snapshot having the highest frequency of appearance is displayed in the large face snapshot area. Eight face snapshots having second to eighth frequencies of appearance are displayed in the medium-size face snapshot areas.

Figure 9:
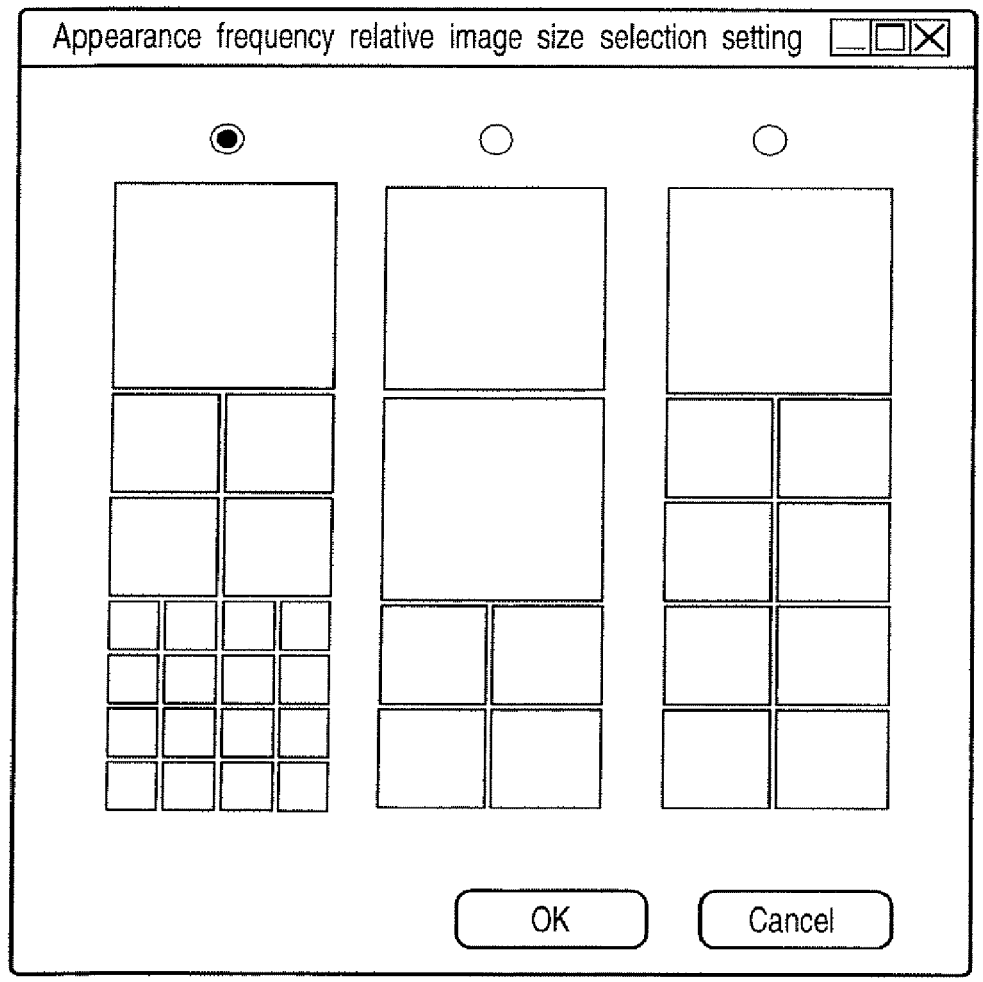
FIG. 9 is a view showing an example of a setting screen that is used to select one arrangement format from the arrangement formats depicted in FIGS. 8A to 8C by a user.

FIG. 9 shows an example of a window which is utilized by the user to select one from the three types of arrangement formats depicted in FIGS. 8A to 8C. As shown in FIG. 9, three examples of large section arrangement formats are displayed. Moreover, radio buttons are provided on upper sides of the respective arrangement formats. When one of the three radio buttons is selected and then an OK button is operated, a selected arrangement format is displayed.

Figure 10:
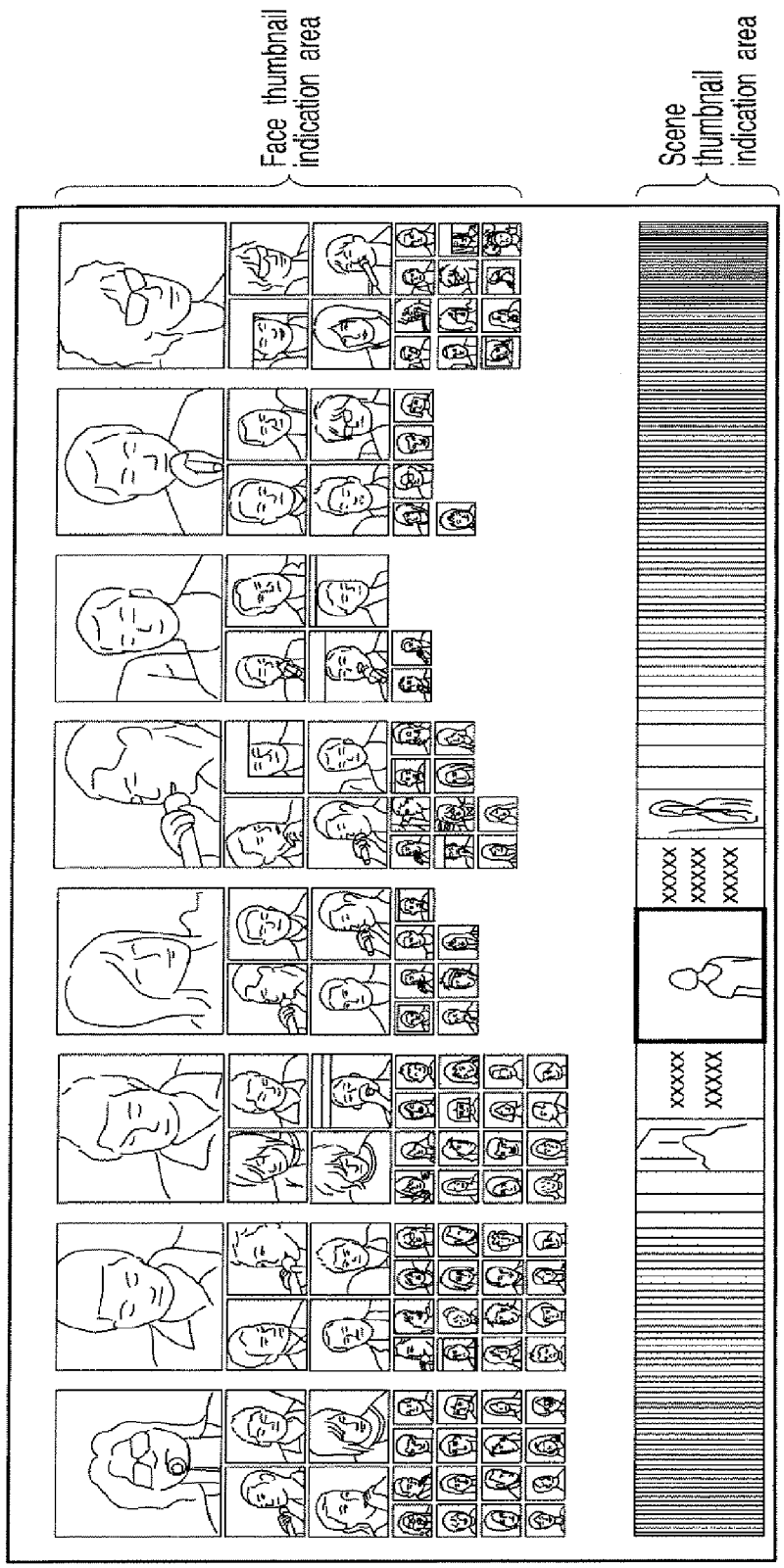
FIG. 10 is a view showing an example of the indexing view screen in which face thumbnail snapshots are subjected to display step in the arrangement format depicted in FIG. 8A.

FIG. 10 shows a display example of the arrangement format depicted in FIG. 8A. As shown in FIG. 10, face snapshots are displayed in the large sections in eight columns above the bellows thumbnail display area in the same arrangement format as that depicted in FIG. 8A. The face snapshots are displayed in the respective large sections in descending order of frequencies of appearance.

Figure 11:
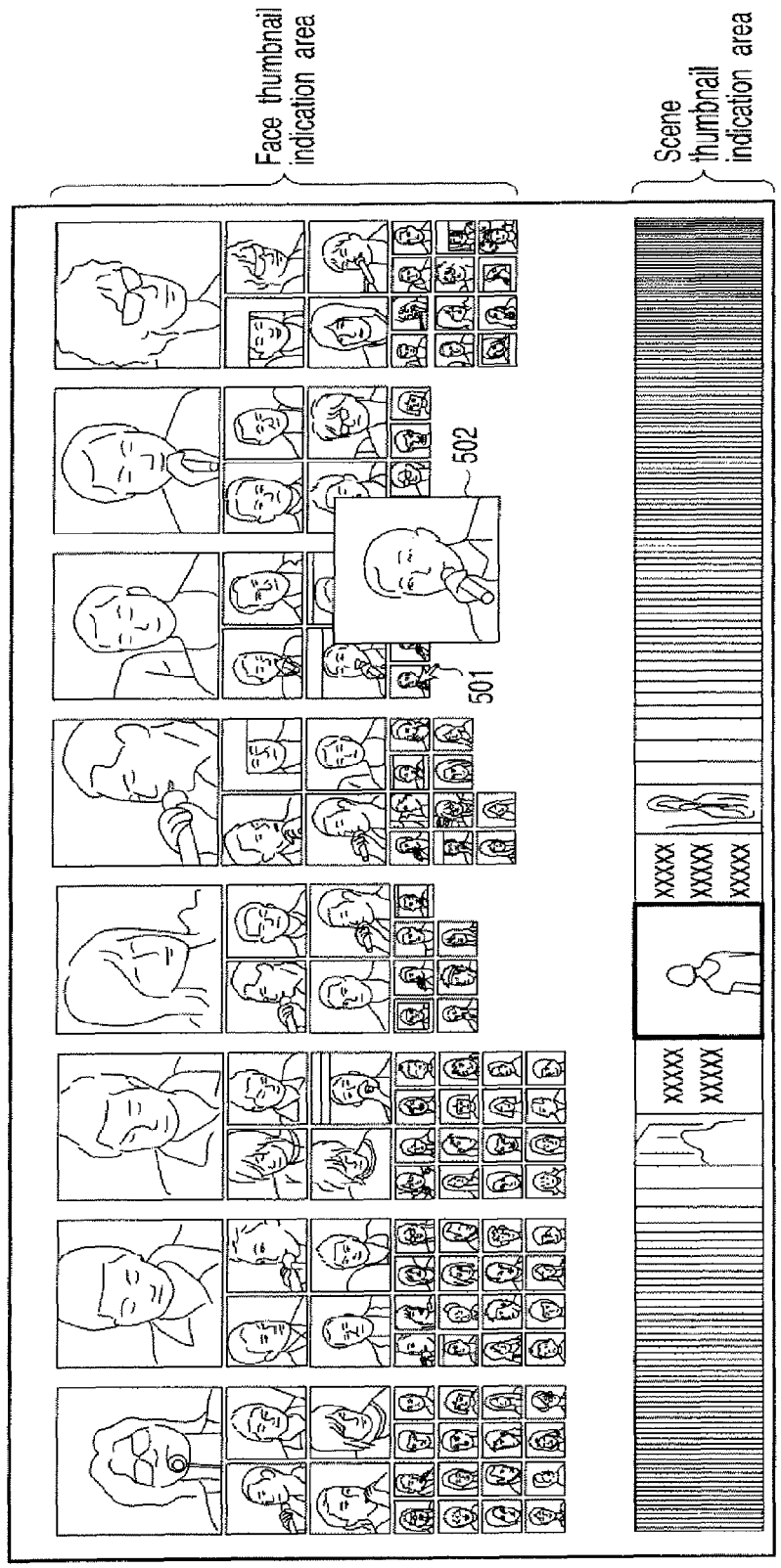
FIG. 11 is a view showing an example of a face thumbnail snapshot that is enlarged and displayed when mouseover is performed with respect to the face thumbnail snapshot in the face thumbnail indication area.

It is to be noted that the face snapshots in the medium-size face snapshot areas and the small face snapshot areas are small and they may be hard to be distinguished in some cases. However, in this apparatus, when a predetermined time elapses in a state where a pointer 501 is placed on the medium-size face snapshot area or the small face snapshot area (mouseover), a face snapshot 502 having the same size as a face snapshot with a large size, e.g., an image in the large face snapshot area may pop up to be displayed aside of the pointer 501 (FIG. 11).

Figure 12:
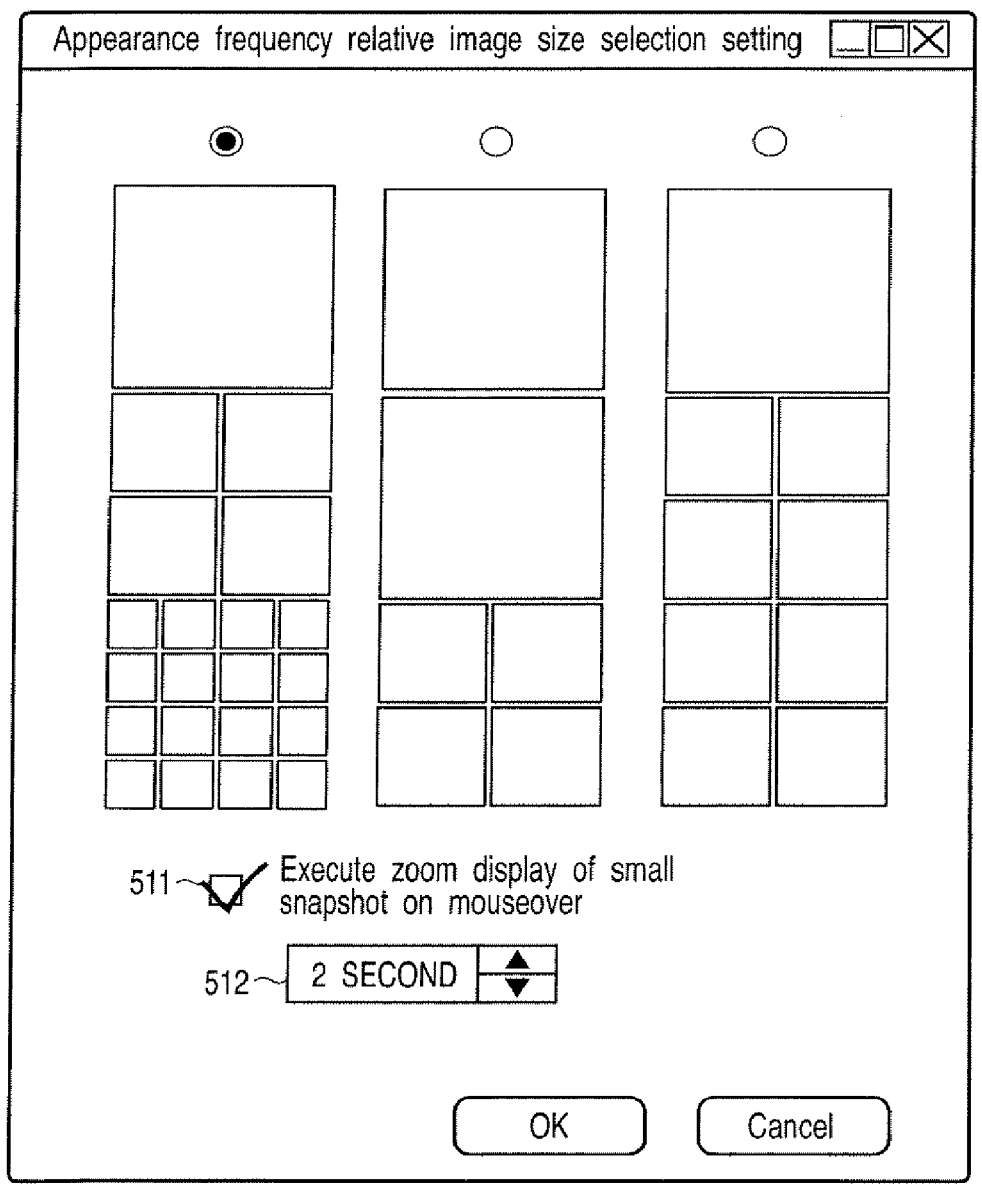
FIG. 12 is a view showing an example of a screen that is used to set a time required until face thumbnail snapshots are displayed by a user.

The user can set a time from the mouseover to the pop-up display. In a setting window depicted in FIG. 12, setting can be affected by selecting a check box 511 and changing numerals indicative of seconds in a rectangular region 512.

When a set time or a mouseover time elapses, an event is input to a face thumbnail indication processing module 301, and the face thumbnail indication processing module 301 executes zoom display of a face snapshot.

Figure 13:
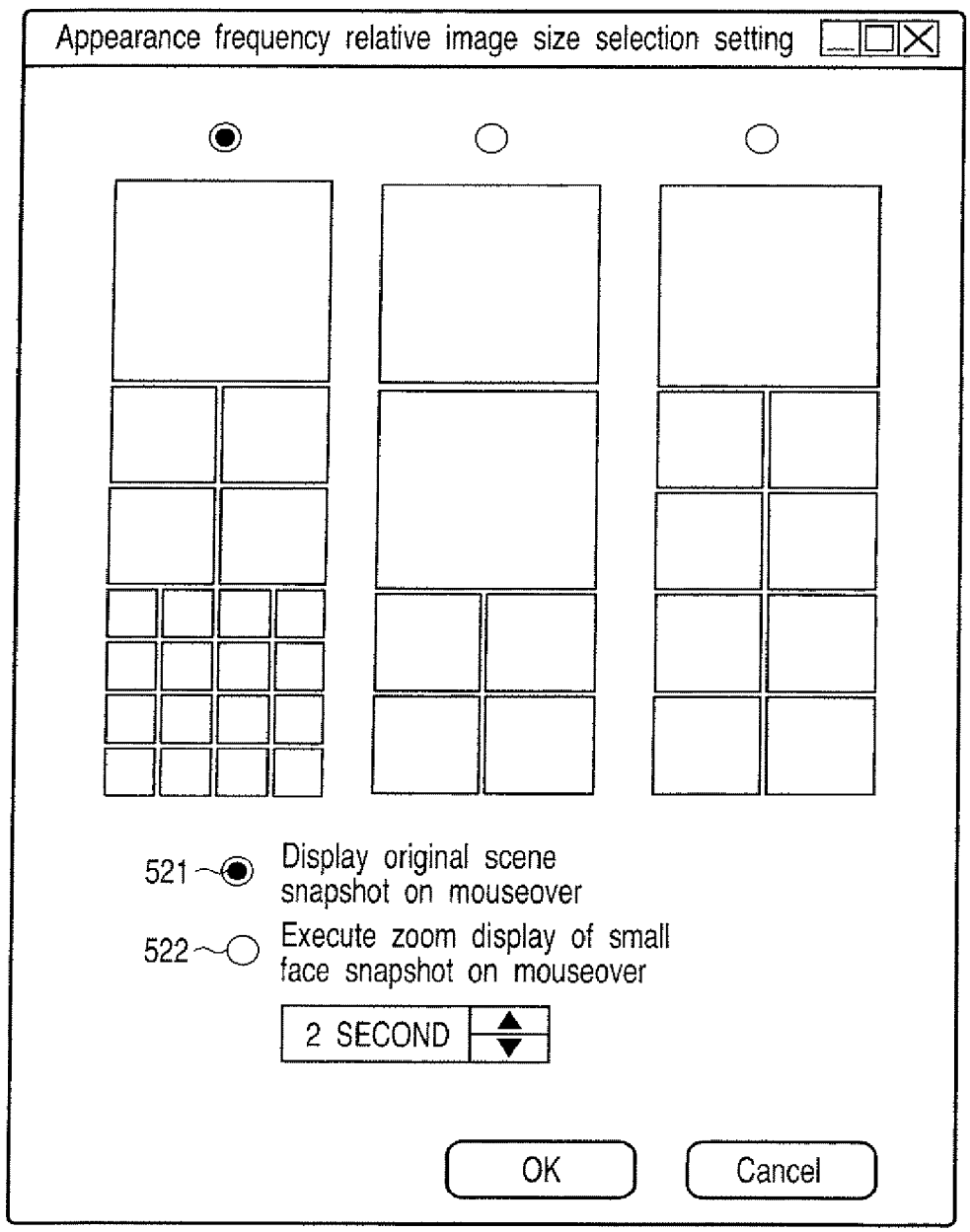
FIG. 13 is a view showing an example of a setting screen that is used to display an original scene thumbnail snapshot from which a face thumbnail snapshot is cut out.

Additionally, an original scene image from which a face thumbnail snapshot is cut out can be displayed after the mouseover in accordance with the setting. This is enabled in all of the large face thumbnail snapshot area, the medium-size face thumbnail snapshot area, and the small face thumb area. FIG. 13 shows an example of a setting window which displays an original scene snapshot from which a face thumbnail snapshot is cut out. As shown in FIG. 13, when the user selects one of two exclusively selectable radio buttons 521 and 522, one of face thumbnail snapshot zoom display and cutout original scene snapshot display in the medium-size face thumbnail snapshot area and the small face thumbnail snapshot area is set.

When the set time or the mouseover time elapses, an event is input to the face thumb indication display processing module 301, and the face thumbnail snapshot indication display processing module 301 executes face thumbnail snapshot zoom display or cutout original scene snapshot display in accordance with the setting.

A procedure of display processing executed by the face thumb indication processing section 301 will now be explained with reference to a flowchart of FIG. 14.

First, the face thumbnail indication processing module 301 sorts face thumbnail snapshots stored in the database 111A in order of appearance time of these face thumbnail snapshots based on the pieces of time stamp information associated with these face snapshots (block S101). Subsequently, the face thumbnail snapshot indicating processing module 301 makes reference specified by the user and evenly divides a total time length of, e.g., video content data as an indexing target by the number of columns to calculate a time zone which is assigned to each column (the large section). Further, the face thumbnail indicating processing module 301 selects face thumbnail snapshots which are equal in number to face thumbnail snapshots displayed in the large section associated with a selected display format from face thumbnail snapshots belonging to the time zone assigned to a column as a display processing target (block S102).

In this case, the face thumbnail indication processing module 301 preferentially selects face thumbnail snapshots having higher appearance frequencies in the time zone assigned to the display processing target column from the face snapshots belonging to this time zone. For example, the video processor 113 can execute clustering processing of classifying respective face snapshots of the same person to the same category based on a correlation of characteristic data of each extracted face thumbnail snapshot. In this case, as shown in FIG. 15, the respective face thumbnail snapshots are classified in accordance with each person (i.e., in accordance with each category) and stored in the database 111A. In FIG. 15, a category 1 represents an aggregation of face thumbnail snapshots of a given person A, a category 2 represents an aggregation of face thumbnail snapshots of a given person B, and a category 3 represents an aggregation of face thumbnail snapshots of a given person C. The face thumbnail indication processing module 301 selects face thumbnail snapshots of a person having a high appearance frequency by priority. It is to be noted that, in a time zone where face thumbnail snapshots alone of the same person keep appearing for a relatively long time, a plurality of different face thumbnail snapshots of the same person may be displayed in a column corresponding to this time zone.

Moreover, when the number of facial images belonging to the time zone assigned to the display processing target column is higher than the number of the rows, the facial image list display processing section 301 can execute processing of preferentially selecting facial images having larger sizes from the facial images belonging to the time zone assigned to the display processing target column based on the pieces of size information of respective facial images stored in the data base 11A.

The processing in blocks 5102 and 5103 is repeatedly executed while updating the number of the display processing target column until processing for all the columns is completed (blocks 5104 and S105).

When the processing for all the columns is completed (NO in block S104), the face thumbnail indication processing module 301 aligns and displays respective scene thumbnail snapshots stored in the database 11A in the scene thumbnail indication area in order of appearance time of the scene thumbnail snapshots based on respective pieces of time stamp information of these scene thumbnail snapshots (block S106).

Figure 16:
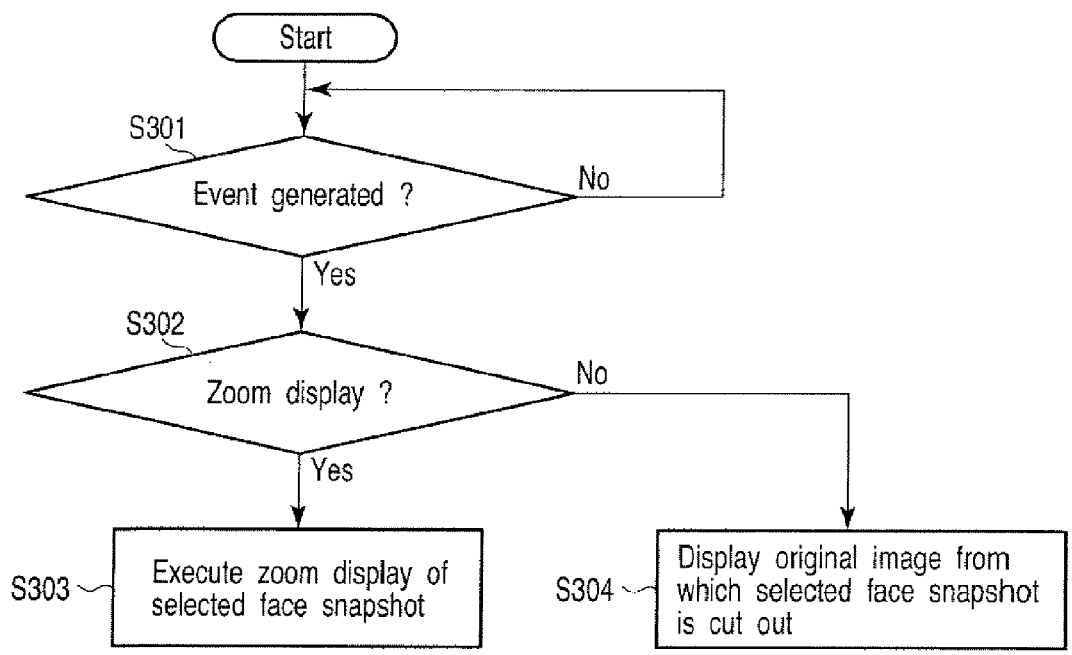
FIG. 16 is a flowchart showing an example of display processing executed by the electronic apparatus according to the embodiment.

A procedure of playback processing executed by the playback processing section 403 will now be explained with reference to a flowchart of FIG. 16.

When the mouseover is carried out on a given face thumb for a fixed time in accordance with a user operation and an event is input to the face thumbnail snapshot indication processing module 301 (YES in block S301), the face thumbnail snapshot indication processing module 301 determines whether execution of zoom display of the face thumbnail snapshot is set (block S302). When execution of zoom display is set (YES in block S302), the face thumbnail snapshot indication processing module 301 performs zoom display of the selected face thumbnail snapshot (block S303). When execution of zoom display is not set (NO in block S302), i.e., when execution of display of an original scene snapshot from which the face thumbnail snapshot is cut out is set, the face thumbnail snapshot indication processing module 301 displays the original scene snapshot from which the selected face thumb is cut out (block S303).

As explained above, according to this embodiment, a list of face thumbnail snapshots in the entire video content data as a target are displayed in sizes associated with frequencies of appearance in accordance with respective appearance time zones. Therefore, it is possible to present the user which person appears in which time zone in the entire video content data with which frequency of appearance without playing back the video content data.

It is to be noted that the video processor 113 that functions as the indexing processing module generates the indexing information (facial image indexing information, section attribute information, and others) in this embodiment, but the indexing processing does not have to be executed when, e.g., the indexing information associated with broadcast program data is previously included in the broadcast program data. Therefore, the face navigation function according to this embodiment can be also realized by using the data base 111A and the face thumbnail indication processing module 301 alone.

Moreover, since the procedure of the face thumb indication processing can be all realized by using software in this embodiment, introducing this software into a regular computer through a computer readable storage medium enables readily realizing the same effect as that of this embodiment.

Additionally, the electronic apparatus according to this embodiment can be realized by not only the computer 10 but also various kinds of consumer electronic apparatuses such as an HDD recorder, a DVD recorder, or a television set. In this case, the function of the TV application program 202 can be realized by hardware such as a DSP or a microcomputer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a storage device configured to store face thumbnail information including a plurality face images extracted from video content data and time information indicative of a time point at which each facial image appears in the video content data;
   an extracting module configured to assign a plurality of time zones to the video content data and to extract face images belonging to each time zone based on the time information;
   a classifying module configured to classify facial images of same person from the extracted facial images;
   a calculating module configured to calculate a frequency of appearance of each of the classified facial images in each time zone; and
   a facial image indication module configured to display a list of the plurality of facial images included in the facial image information in a facial image indication, the facial image indication having time-zone-specific display areas corresponding to the plurality of time zones, each facial image displayed in each time-zone-specific display area being displayed in a size based on the frequency of appearance.

2. The apparatus according to claim 1, further comprising an processing module configured to extract the plurality of facial images from the video content data.

3. The apparatus according to claim 1, further comprising selecting module configured to allow a user to specify a display format displayed in the facial image indicating area from a plurality of display formats displayed in sizes based on the frequencies of appearances.

4. The apparatus according to claim 1, wherein the processing module is configured to output time information indicating a time point at which each extracted facial image appears in the video content data.

5. The apparatus according to claim 1, wherein, the facial image indication module enlarges and displays one facial image or displays a scene image from which the facial image is extracted, when an event for one facial image is input in accordance with an operation by the user.

6. The apparatus according to claim 5, further comprising setting module configured to set an operation of the user to input the event.

7. A facial image display method which is executed by an electronic apparatus, the method comprising:
   classifying, by the electronic apparatus, facial images of same person from facial images in facial thumbnail information extracted from video content data and time information indicative of a time point at which each facial image appears in the video content data;
   assigning, by the electronic apparatus, a plurality of time zones to the video content data
   extracting, by the electronic apparatus, face images belonging to each time zone based on the time information;
   classifying, by the electronic apparatus, facial images of same person from the extracted facial images;
   calculating, by the electronic apparatus, a frequency of appearance of each of the classified facial images in each time zone; and
   displaying, by the electronic apparatus, a list of the plurality of facial images included in the facial image information in a facial image indication, the facial image indication having time-zone-specific display areas corresponding to the plurality of time zones, each facial image displayed in each time-zone-specific display area being displayed in a size based on the frequency of appearance.

8. The method according to claim 7, wherein a plurality of display formats which are displayed in sizes based on the frequencies of appearance are prepared, and the facial images are displayed in each time-zone-specific display area in accordance with display format specified by a user.

9. The method according to claim 7, wherein, when an event that is generated with respect to one facial image is produced in accordance with an operation of a user, the one facial image is enlarged and displayed, or a scene image from which the facial image is extracted is displayed.

* * * * *